United States Patent
O'Connor et al.

(10) Patent No.: US 10,064,422 B2
(45) Date of Patent: Sep. 4, 2018

(54) PROCESS FOR REDUCING THE ALCOHOL AND/OR SUGAR CONTENT OF A BEVERAGE

(71) Applicant: D'ALCANTE B.V., Hoevelaken (NL)

(72) Inventors: Paul O'Connor, Hoevelaken (NL); Sjoerd Daamen, Bocairent (ES)

(73) Assignee: D'ALCANTE B.V., Hoevelaken (NL)

( * ) Notice: Subject to any disclaimer, the term of this patent is extended or adjusted under 35 U.S.C. 154(b) by 121 days.

(21) Appl. No.: 14/781,930

(22) PCT Filed: Apr. 4, 2014

(86) PCT No.: PCT/EP2014/056859
§ 371 (c)(1),
(2) Date: Oct. 2, 2015

(87) PCT Pub. No.: WO2014/161998
PCT Pub. Date: Oct. 9, 2014

(65) Prior Publication Data
US 2016/0213049 A1    Jul. 28, 2016

Related U.S. Application Data

(60) Provisional application No. 61/808,723, filed on Apr. 5, 2013, provisional application No. 61/833,059, filed on Jun. 10, 2013, provisional application No. 61/844,446, filed on Jul. 10, 2013.

(51) Int. Cl.
| | |
|---|---|
| *A23L 2/80* | (2006.01) |
| *C12H 1/07* | (2006.01) |
| *B01J 20/28* | (2006.01) |
| *C12H 1/044* | (2006.01) |
| *C01B 33/12* | (2006.01) |
| *B01J 20/12* | (2006.01) |
| *B01J 20/18* | (2006.01) |
| *B01J 20/20* | (2006.01) |
| *B01J 20/32* | (2006.01) |
| *B01J 20/22* | (2006.01) |
| *C12G 3/08* | (2006.01) |

(52) U.S. Cl.
CPC ............ *A23L 2/80* (2013.01); *B01J 20/12* (2013.01); *B01J 20/18* (2013.01); *B01J 20/183* (2013.01); *B01J 20/186* (2013.01); *B01J 20/20* (2013.01); *B01J 20/22* (2013.01); *B01J 20/2803* (2013.01); *B01J 20/28004* (2013.01); *B01J 20/3204* (2013.01); *B01J 20/3234* (2013.01); *B01J 20/3244* (2013.01); *C01B 33/126* (2013.01); *C12G 3/08* (2013.01); *C12H 1/0408* (2013.01); *C12H 1/063* (2013.01); *A23V 2002/00* (2013.01)

(58) Field of Classification Search
CPC .... A23L 2/80; B01J 20/12; B01J 20/18; B01J 20/183; B01J 20/186; B01J 20/20; B01J 20/22; B01J 20/28004; B01J 20/2803; B01J 20/3204; B01J 20/3234; B01J 20/3244; C01B 33/126; C12G 3/08; C12H 1/0408; C12H 1/063
See application file for complete search history.

(56) References Cited

U.S. PATENT DOCUMENTS

| | | | |
|---|---|---|---|
| 6,472,009 B1 * | 10/2002 | Berrebi | C12G 3/08 426/330.4 |
| 2008/0272041 A1 * | 11/2008 | Wollan | C12G 3/085 210/180 |
| 2013/0112078 A1 * | 5/2013 | Takagi | C04B 35/14 96/11 |

FOREIGN PATENT DOCUMENTS

| | | | |
|---|---|---|---|
| EP | 859049 | * | 8/1998 |
| JP | 58078578 | * | 5/1983 |
| JP | H0824561 | * | 3/1996 |
| JP | 2007238412 | * | 9/2007 |

OTHER PUBLICATIONS

Faujasite—A.K.A. Zeolite Y. No date provided. http://www.personal.utulsa.edu/~geoffrey-price/zeolite/fau.htm.*
English Translation for JP 58078578 published May 1983.*
English Translation for JP2007238412 published Sep. 2007.*
English Translation for JP H0824561 published Mar. 1996.*
English Translation for EP859049 published Aug. 1998.*

* cited by examiner

*Primary Examiner* — Anthony Weier
(74) *Attorney, Agent, or Firm* — Hoyng Rokh Monegier; Ramin Amirsehhi

(57) ABSTRACT

A process is shown for reducing the alcohol content and/or the sugar content of a beverage. The process includes wetting a predetermined amount of a particulate solid material with a predetermined amount of water, and contacting the beverage with the pre-wetted solid adsorbent material. The material selectively adsorbs alcohol, sugar, or alcohol and sugar from the beverage. The process can be carried out at a small scale and does not require any sophisticated equipment.

24 Claims, No Drawings

US 10,064,422 B2

PROCESS FOR REDUCING THE ALCOHOL AND/OR SUGAR CONTENT OF A BEVERAGE

CROSS REFERENCE TO RELATED APPLICATION

This U.S. application Ser. No. 14/781,930 is a 35 U.S.C. 371 National Phase Entry Application from PCT/EP2014/056859, filed Apr. 4, 2014, which claims the benefit of US provisional priority applications U.S. 61/808,723 filed 5 Apr. 2013, U.S. 61/833,059 filed 10 Jun. 2013 and U.S. 61/844,446 filed 10 Jul. 2013, the disclosure of which is incorporated herein in its entirety by reference.

BACKGROUND OF THE INVENTION

1. Field of the Invention

The invention relates generally to a process for reducing the alcohol content and/or the sugar content of a beverage, and more particularly to such a process that can be carried out on a small scale, for example by a consumer.

2. Description of the Related Art

For some time it has been recognized that many consumers enjoy the taste experience of drinking alcoholic beverages such as beer and wine, but for health or other reasons prefer to reduce their alcohol intake. Non-alcoholic beer and wine products are on the market intended to cater to this segment of the consumer population.

Likewise, many consumers like the taste of soft drinks, but want to reduce their sugar intake. For decades this segment of the consumer population is being served with low-sugar and sugar-free soft drinks, Manufacturers attempt to match the taste of the sugar-containing compositions by using artificial sweeteners. However, the taste profile of artificial sweeteners is different from that of sugar, and is disliked by a large portion of the public. In addition, artificial sweeteners such as aspartame cause allergic reactions in a significant portion of the population.

More recently health concerns have been raised about sugars that are naturally present in fruit juices.

Several methods have been proposed for reducing the alcohol content of alcoholic beverages, such as wine. One approach is the use of reverse osmosis, as disclosed in U.S. Pat. No. 4,963,381. Reverse osmosis requires significant capital investment. In addition the operation of a reverse osmosis process is energy intensive, and therefore costly. In reverse osmosis both water and alcohol are removed from the wine, leaving a flavor concentrate. The wine is reconstituted, in non-alcoholic form, through the addition of demineralized water. This circuitous route further adds to the cost of operating the process.

Another approach relies on removal of the alcohol component by distillation. Atmospheric distillation requires temperatures in excess of 78.5° C., the boiling point of ethanol. Such high temperatures are detrimental to the flavor components of the beverage. Moreover, water and ethanol form an azeotropic mixture, making it impossible to reduce the alcohol content of a beverage to less than 4% by using distillation.

To avoid the high temperatures required for atmospheric distillation several inventors have proposed distillation at reduced pressure. U.S. Pat. No. 4,963,381 discloses a process in which wine is diluted with water, and then stripped under high vacuum to remove alcohol. The stripped product is blended with concentrated fruit juice flavorants.

U.S. Pat. No. 5,093,141 discloses a process comprising vacuum film distillation.

EP 0 062 799 A1 discloses a process in which the aroma components of wine are extracted with an organic solvent, such as diethylether, leaving a water/alcohol mixture. This mixture is subjected to distillation to separate the water from the alcohol. The organic solvent is removed from the extract by evaporation. The extracted flavorants are mixed with the water to produce a non-alcoholic wine product. Any residual organic solvent would have a strong and undesirable flavor impact on the resulting beverage.

WO 2011/088809 discloses a process wherein an alcoholic beverage is partially frozen at a temperature below −4° C., resulting in ice crystals and a liquid alcoholic phase. The ice crystals are separated from the liquid phase by filtration. It is unclear whether flavor components are removed with the liquid alcoholic phase.

The above-described prior art processes are unsuitable for operation on a small scale at a consumer's home.

CN 102658095 (A) discloses a co-polymer of butyl acrylate, methyl methacrylate and, optionally, hydroxyethyl acrylate. The polymer is disclosed to selectively adsorb alcohol from an alcohol aqueous solution. The document does not disclose the acrylate monomer content of the polymer. Unreacted monomer present in the polymer would impart an undesirable taste to the beverage, and would lead to health concerns as acrylate monomers are considered carcinogenic.

U.S. Pat. No. 5,308,631 discloses a process for removing alcohol from beer. The process comprises contacting beer with a hydrophobic zeolite, whereby alcohol and aroma components are adsorbed to the zeolite. The adsorbed products are desorbed, and the desorbed phase is split into an alcohol phase and an aroma phase. The aroma phase is mixed with the dealcoholized beer. The zeolites suitable for this process have Si:Al molecular ratio higher than 12.

U.S. Pat. No. 6,472,009 B1 discloses a process for removing alcohol from an alcoholic beverage. The process comprises passing the alcoholic beverage through a molecular sieve bed that selective adsorbs ethyl alcohol. The molecular sieve material is essentially alumina free, so as to be hydrophobic. Examples include silicalite, ZSM-5, and zeolite Y from which alumina has been removed.

The use of de-aluminated zeolites has several disadvantages. De-alumination adds to the cost of the zeolite material, and reduces its adsorbent capacity.

The present invention addresses these problems by providing an improved process for selectively adsorbing alcohol and/or sugar from a beverage.

BRIEF SUMMARY OF THE INVENTION

The invention relates to a process for reducing the alcohol content and/or the sugar content of a beverage, said process comprising the steps of:

contacting the beverage with a particulate porous adsorbent material; and separating the beverage from the particulate porous adsorbent material; the particles of the porous adsorbent material having been treated externally with a hydrophobic coating.

In a preferred embodiment the particulate porous adsorbent material is pre-wetted by contacting the particulate adsorbent material with an aqueous liquid.

The adsorbent solid particles may be regenerated by driving off adsorbed alcohol, optionally in a microwave oven. Adsorbed sugars and/or alcohol may be removed, for example by steeping in hot, preferably boiling water, optionally followed by drying.

DETAILED DESCRIPTION OF THE INVENTION

The following is a detailed description of the invention.

The present invention addresses the need for modifying the composition of beverages by removing alcohol and/or sugar from the beverage. The starting point generally is a beverage having a desirable taste profile. The removal of alcohol and or sugar preferably is carried out while minimizing the removal of other flavor components.

To be clear, both sugar and alcohol contribute to the flavor profile of a beverage, and their removal inevitably results in a change in the flavor profile of the beverage. This change may in fact be experienced as a positive one. For example, the presence of a large amount of sugar in a soft drink or a fruit juice may overwhelm other, more subtle flavors present in the beverage, and the removal of a significant part or all of the sugar may make these other flavors more noticeable and more enjoyable. Similarly, in certain wines the alcohol content may be so high as to mask the true bouquet of the wine, and a reduction of the alcohol content could result in an improvement in the wine's character.

In any event, many consumers desire to reduce their intake of sugar and/or alcohol, and are prepared to accept a change in the flavor of a beverage even if the change might at first be perceived as a negative one. It has been found that, over time, consumers adjust to the new flavor profile, and react negatively to a change back to the original profile.

Reducing the alcohol content of a beverage also significantly reduces its caloric content. For example, the caloric content of a dry wine having alcohol content of 12 vol % is reduced by about one third when the alcohol content is lowered to 6 vol %.

Thus, the invention relates to a process for reducing the alcohol content and/or the sugar content of a beverage, said process comprising the steps of:
contacting the beverage with a particulate porous adsorbent material; and
separating the beverage from the particulate porous adsorbent material;
the particles of the porous adsorbent material having been treated externally with a hydrophobic coating.

The term "hydrophobic" as used herein refers to any material that is more hydrophobic (or less hydrophilic) than the porous adsorbent material. The purpose of the coating is to reduce adsorption at the outer surface and in the large pores of the particles, without affecting the adsorption in the small pores of the particle to too great an extent.

The invention will be illustrated in more detail with reference to the reduction of the alcohol content of wine. The skilled person will appreciate that the process of the invention can be used to remove alcohol from alcoholic beverages other than wine, and for the removal of sugars from both alcoholic and non-alcoholic beverages the latter including fruit juices and soft drinks.

For the removal of alcohol from wine an adsorbent material is selected having a pore size large enough to allow ethanol to enter the pores, but small enough to prevent significantly larger molecules from entering the pores. The size of an ethanol molecule is 0.44 nm (4.4 Angstrom). Alumino silicates, such as zeolites, have well defined pores and narrow pore-size distributions. Particularly suitable for use as porous adsorbent materials are zeolites having a pore size in the range of from 0.45 nm to about 1.0 nm. ZSM5, for example, has pore sizes in the range of 0.54 to 0.56 nm (5.4 to 5.6 Angstrom), large enough to accommodate ethanol molecules, yet small enough to prevent adsorption of esters, ketones and other flavor molecules by size exclusion. Zeolite beta, which has a slightly larger pore size than ZSM5, is also very suitable.

The porous adsorbent material is preferably used in the form of particulates, such as beads or pellets. Although adsorption of flavor molecules inside the pores is prevented through size exclusion, it has been found that the particulates present larger pores, as well as adsorption sites at the outer surfaces of the particulates, that are capable of adsorbing larger molecules, such as flavorants. The number of adsorbent sites that are accessible to these larger molecules is small as compared to the adsorbent sites inside the smaller pores, but the taste balance of in particular fine wines is sufficiently delicate to suffer from the removal of even small amounts of key flavor components.

For this reason the particulates are coated with a hydrophobic coating. It is believed that the presence of a hydrophobic coating masks the adsorption sites that are easily accessible to larger molecules. Importantly, the coating is not applied to the inner walls of the small pores, so that the adsorbent capacity for ethanol is not impaired. In the case of alumino silicates, the adsorbent sites at the outer surfaces of the particles are believed to consist primarily of surface hydroxyl groups bound to surface silicon atoms. Providing a hydrophobic coating may comprise replacing these surface hydroxyl groups with oxygen bridges and/or hydrophobic organic moieties, such as alkoxyalkanes, silanes, siloxanes, and the like.

Prior art processes generally suffer from the disadvantage that adsorbent materials used in these processes adsorb significant quantities of water from the beverage. In principle the water content of the beverage can be restored by adding to water to compensate for water lost by adsorption. However, dissolved minerals and other small flavor molecules are adsorbed together with the adsorbed water, so that the flavor of the beverage is negatively affected. Of course, this effect cannot be corrected by simply adding water to the beverage.

It has surprisingly been found that undesired water adsorption from the beverage can be reduced or even eliminated by pre-wetting the adsorbent particles prior to contacting the particles with the beverage. The amount of water used for pre-wetting the solid particles preferably is sufficient to fully wet the solid particles. The amount of water can be determined as follows. A representative sample of the adsorbent material is weighed to determine its dry weight dw. The sample is then contacted with excess water so that the adsorbent material is fully saturated with water. Excess water is removed by spreading the solid particles on a sieve or foraminous screen. The sample is weighed again to determine its wet weight, ww. The amount of adsorbed water is given by ww minus dw, and is expressed as grams of water per gram of dry adsorbent material.

It has surprisingly been found that the wet adsorbent material is capable of adsorbing alcohol and/or sugar from a beverage. Apparently the affinity of the adsorbent material for alcohol and sugars is greater than its affinity for water, so that adsorbed water gets displaced by alcohol or sugars. Pre-wetting of the adsorbent material has the beneficial effect of avoiding net adsorption of water from the beverage.

The particulate non-polymeric solid material preferably has a minimum particle size in the range of from 100 to 2000 µm. The disclosure of U.S. Pat. No. 6,472,009 B1 teaches away from the use of particles smaller than 1 mm, as such fine particles would be difficult to remove from the beverage by filtration. The present inventors have found it desirable to use solid materials comprising particles in the 0.1 mm to 1 mm range, as such particles have favorable adsorption kinetics. Separating these fine particles from the beverage has not been found to be particularly challenging.

In a preferred embodiment the adsorbent is agglomerated into shaped bodies, such as beads, extrudates, pellets or the like. Shaped bodies having a global shape are preferred. The shaped bodies preferably have a mean particle diameter in the range of from 2 to 50 mm, preferably from 2 to 5 mm.

In an embodiment the particulate non-polymeric particulate material is coated with a hydrophobic coating, such as silica or silicone. The material may comprise a core of hydrophobic material or hydrophilic material. Importantly, the use of a hydrophobic coating broadens the scope of suitable adsorbent material, as hydrophilic materials may be used in the core. A hydrophobic coating may be formed during the process for making the shaped bodies. For example, fast drying of granulates, or an extrusion process, generally results in shaped bodies having a surface that is more hydrophobic than the core. The hydrophobic coating ensures that water does not excessively compete with alcohol for adsorption sites, even if a hydrophilic material is used in the core.

In a preferred embodiment the hydrophobic coating comprises silica.

The non-polymeric adsorbent material or the core of the non-polymeric adsorbent material can be an inorganic material, such as a layered hydroxide; a clay; hydrotalcite; a hydrotalcite-like material; a zeolite; an activated coal, or the like. For the purpose of the present invention activated coal is considered an inorganic material, even though its origin may be organic. The term "hydrotalcite-like material" as used herein refers to crystalline materials having the structure of hydrotalcite, wherein (part of) the Mg cations are replaced with other bivalent cations; and/or (part of) the Al cations are replaced with other trivalent cations.

The term "non-polymeric" as used herein means a material that is not built up from organic monomers. Certain inorganic materials are sometimes referred to as "polymeric", and the term "non-polymeric" as used herein is intended to encompass such so-called polymeric inorganic materials.

In general, preferred adsorbent materials are crystalline materials having pores that are determined by the crystalline structure of the material. Such materials typically have pores of a well-defined diameter, which is important for the selective character of the adsorption properties of the material. Examples include zeolites, in particular zeolite-beta and ZSM-5. Preferably the zeolite has a Si:Al ratio <100, more preferably <50.

Zeolite-beta is particularly suitable for removing sugar from sugar-containing beverages, as its pore size is large enough to accommodate sugar molecules, including saccharose, glucose and fructose. Zeolite-beta can also be used to remove alcohol from wines that are fully fermented, i.e., wines that do not contain residual sugars. Zeolite-beta is less suitable for removing alcohol from wines containing residual sugars, as sugars would be removed together with the alcohol.

ZSM-5 is an example of a zeolite that selectively removes alcohol from a beverage that also contains sugar. ZSM-5 is particularly suitable for removing alcohol from beer and from wines containing residual sugars.

Hydrophilic adsorbent materials tend to also adsorb water. As water is abundantly present in any beverage, the adsorbent capacity of the adsorbent material may become overwhelmed by water. It is desirable to make hydrophilic adsorbent materials less hydrophilic by coating the surface with a hydrophobic material. Silica is an example of a suitable hydrophobic material. Techniques for providing a coating of silica onto a porous material are well known from the art of catalyst preparation, and do not form part of the present invention. An example of a suitable coating technique comprises coating the particles with TEES (tri ethoxy ethyl silane) and hydrolyzing this alkoxide to silica.

It has been found that zeolite can be coated with silica using standard catalyst preparation techniques, such as spray drying, microsphere preparation, and granulation. Suitable techniques for granulation and microsphere preparation are disclosed in WO 2004/054713 A1, the disclosures of which are incorporated herein by reference.

In spray drying a slurry is prepared comprising zeolite particles and silica particles. The slurry is spray dried using standard techniques. The resulting particles comprise zeolite particles and/or agglomerates of zeolite particles coated with a glassy silica coating. Optionally the slurry may contain additional components, in particular a clay, for example a kaolin clay.

In a preferred embodiment the solid particulate material comprises from 60% to 95% by weight of a zeolite, preferably a zeolite having Si:Al ratio <50; from 5% to 40% by weight of silica; and from 0% to 15% by weight of clay, preferably kaolin clay.

It is also possible to put a desired quantity of particulate material into a bag of permeable material, for example nylon mesh, and to put this bag into a container, for example a decanter. The beverage is poured into the container so it may interact with the particulate material.

In another embodiment the particulate material is pressed into a brick or cake, for example in the form of a round disk, which may be put at the bottom of a container in which the beverage is poured for contact with the adsorbent material.

The time of contact between the beverage and the particulate non-polymeric material generally is in the range of 2 minutes to 3 hours or more, and is primarily a function of the desired end-point and of the use and nature of agitation of the beverage. Generally the adsorption process is diffusion controlled and, after an initial spurt, evolves linearly with time. The process may be accelerated by agitating the beverage, but this is often undesirable. Vigorous agitation of wine, for example, results in undesirable oxidation of precious flavor components, and vigorous agitation of carbonated beverages results in excessive loss of carbonation. In many cases no agitation is used at all, and the process is allowed to proceed for several hours.

The adsorption process is generally carried out at ambient temperature. It is possible also to allow the process to take place at reduced temperature, for example in a refrigerator, provided allowances are made for the lower diffusion rates associated with lower temperatures.

The amount of adsorbent material depends on the starting composition of the beverage, the nature of the adsorbent material and on the desired end-point of the process. As a general rule, the weight ratio beverage:particulate solid material is in the range of from 10:1 to 1:5, preferably from 4:1 to 1:2, more preferably from 3:1 to 1:1.

The progress of the adsorption process can be monitored, for example, by measuring the density or the specific gravity of the beverage. The density of water is 1000 grams/liter; that of alcohol is 789 grams/liter; and that of sugar is 1587 grams/liter. Generally the removal of alcohol from a beverage increases its density, and the removal of sugar results in a decrease in density.

For perspective, assuming that the adsorption process removes only alcohol (for example, because no sugar is present in the beverage, or because no sugar is adsorbed), reduction of the alcohol content of the beverage by 1 percentage point results in an increase of the density of about 20 grams/liter.

The alcohol content of an alcoholic beverage may be determined with a so-called vinometer. This is a glass instrument with a capillary, which is used to determine the surface tension of a liquid. The surface tension of the beverage is a function of its alcohol content.

In general, wine has alcohol content of 10% by volume or more. The process of the invention generally results in lowering the alcohol content to 8% by volume or less.

In the case of a soft drink having a sugar content of at least 15% by weight the process generally results in lowering the sugar content to 10% by weight or less.

It can be desirable to measure the sugar content or the alcohol content of the resulting beverage. If the sugar content or the alcohol content is not sufficiently lowered the process steps may be repeated.

The adsorbent material may be separated from the beverage by any liquid/solid separation method, for example decantation or filtration. Filtration is preferred, to avoid clouding of the beverage by adsorber dust. It is important to use a filter material that does not absorb flavor components of the beverage, and does not leach undesirable contaminants, for example plasticizers, into the beverage. The inventors have found that glass and polytetrafluoroethylene (also known as PTFE or Teflon®) are particularly suitable filter materials. Paper filters have been found to negatively affect the flavor of the beverage and are preferably not used in the process of the invention.

After use, the particulate solid material can be regenerated by driving off adsorbed alcohol, for example in an oven. Adsorbed sugars and/or alcohol may be removed, for example by steeping in hot water, preferably boiling water. In general steeping for 10 minutes to 60 minutes is sufficient to remove the adsorbed sugar and/or alcohol. The regenerated solid material can be air dried, or dried in a warm oven, for example at 120° C. The dried regenerated material is ready for re-use. Preferably the material is regenerated just prior to re-use the drying step and the pre-wetting step may be omitted.

Regeneration in a microwave oven has been found to impart a burnt taste to the particulate material, due to overheating and/or oxidation of adsorbed flavor components.

It has been found that regeneration in hot water benefits from addition of an acid or an acidic buffer to the water. This practice is particularly beneficial when the adsorbent material contains a zeolite, as the presence of acid or an acidic buffer ensures that the zeolite is converted to the desired acid-form or H-form. Any cations picked up from the beverage are exchanged with protons.

Carboxylic acids are particularly suitable, as these acids are generally suitable for human consumption and therefore allowed to come into contact with materials that come into contact with foods and beverages. Moreover, carboxylic acids, being weak acids, form natural buffers. Acetic acid is particularly preferred. For adsorbent materials for use with wine a preferred source of acetic acid is wine vinegar, as it contains flavor components that are also present in wine.

If the adsorbent material is not immediately re-used, it is preferred to store it as-is in a closed container, without regeneration. The alcohol content ensures safe storage without developing microbial contamination. The used adsorbent material is preferably regenerated just prior to its next use.

An important aspect of the present invention is that it may be carried out with small quantities of beverage, and does not require any type of sophisticated equipment, which makes the process particularly suitable to be carried out by a consumer.

In an alternate embodiment the invention is carried out on a larger scale at a winery or a bottling company, prior to bottling. It has been found that a reduction of the alcohol content of a wine results in a flavor profile that is preferred by many consumers. If the alcohol content is reduced only moderately, specifically to a level of 4% or higher, the remaining alcohol content is sufficient to ensure stable storage of the bottled wine.

Another aspect of the invention is a presentation of the adsorption properties of the solid particulate material, for example an adsorption curve representing the amount of alcohol adsorbed from an alcoholic beverage as a function of time. The presentation may contain a number of such curves, corresponding to different starting alcohol content of the alcoholic beverage. A user of the solid adsorbent material may use this presentation to determine the adsorption time required to reach a desired alcohol level.

Another aspect of the invention is a kit comprising:
a predetermined amount of the solid particulate material; and/or
information on the adsorption properties of the solid material suitable for determining an adsorption time; and/or
a tool for measuring the alcohol content of a beverage; and/or
usage instructions.

The kit may further comprise a vessel for carrying out the adsorption process; a filter for separating adsorbent material from the wine; a second vessel for pouring the wine during filtration; a timer; and the like.

EXAMPLES

Example 1

Adsorbent beads are prepared by growing ZSM-5 onto beads of zeolite-beta. The zeolite-beta beads have a mean particle size of 2 mm. ZSM-5 formation is stopped when the beads reach a mean particle size of 2.2 mm. 25 grams of the resulting beads are mixed with 50 grams of wine having alcohol content of about 13% by volume. After two hours the alcohol content is reduced to below 4% by volume.

Example 2

Adsorbent beads are prepared by growing ZSM-5 zeolite onto beads of activated carbon. 50 grams of the resulting beads are mixed with 50 grams of wine having alcohol content of about 13% by volume. After two hours the alcohol content is reduced to below 4% by volume.

Example 3

Beads of zeolite-beta are coated with TEOS. The TEOS is hydrolyzed to silica, which forms a hydrophobic coating on the zeolite beads. 50 grams of the resulting beads are mixed with 50 grams of wine having alcohol content of about 13% by volume. After two hours the alcohol content is reduced to below 4% by volume.

A slurry comprising 80 wt % ZSM-5, particle size 100 μm; 15 wt % silica, mean particle size 25 μm; and 5 wt % kaolin clay is spray dried to form beads having mean particle size of 200 μm. The beads have a glassy surface. About 10 grams of the spray dried material are mixed with 10 grams of wine having alcohol content of about 11% by volume. After about 1 hour the wine is separated from the particles by decantation, followed by filtration.

Example 4

25 grams of round beads of zeolite-beta are mixed with 50 grams of a soft drink containing 20% by weight sugar. The mixture is allowed to stand at room temperature for one hour. The sugar content is reduced to below 5% by weight.

What is claimed is:

1. A process for reducing the alcohol content and/or the sugar content of a beverage, said process comprising the steps of:
   a. contacting the beverage with a particulate porous adsorbent material; and
   b. separating the beverage from the particulate porous adsorbent material;
      the particles of the porous adsorbent material having been treated externally with a hydrophobic coating and wherein the particulate porous adsorbent material has a minimum particle size in the range of from 0.1 to 1 mm.

2. The process of claim 1 wherein the particulate porous adsorbent material is pre-wetted with an aqueous liquid prior to step a.

3. The process of claim 2 wherein the aqueous liquid comprises a pH buffer.

4. The process of claim 3 wherein the pH buffer comprises vinegar.

5. The process according to claim 1 wherein the adsorbent material is agglomerated into shaped bodies having a mean particle diameter in the range of from 2 to 5 mm.

6. The process according to claim 1 wherein the particulate porous adsorbent material is a non-polymeric adsorbent material.

7. The process according to claim 1 wherein the hydrophobic coating comprises silica.

8. The process according to claim 1 wherein the hydrophobic coating comprises alkoxyalkane, siloxane, silane, or a combination thereof.

9. The process according to claim 1 wherein the particulate porous adsorbent material comprises a zeolite, an activated carbon, or a combination thereof.

10. The process of claim 9 wherein the zeolite has a Si:Al ratio <50.

11. The process of claim 10 wherein the zeolite has a Si:Al ratio <12.

12. The process according to claim 9 wherein the particulate porous adsorbent material comprises ZSM-5, zeolite-Y or zeolite-beta, or a combination thereof.

13. The process of claim 12 wherein the particulate porous adsorbent material comprises ZSM5.

14. The process according to claim 9 wherein the particulate porous adsorbent material comprises zeolite and a silica binder.

15. The process of claim 14 wherein the particulate porous adsorbent material further comprises a clay.

16. The process according to claim 9 wherein the particulate porous adsorbent material is prepared by spray drying a slurry comprising a zeolite, a silica binder or by extruding a mixture comprising a zeolite, a silica binder.

17. The process according to claim 1 wherein the beverage is a wine, a soft drink, a fruit juice, or a mixture thereof.

18. The process according to claim 1 wherein the beverage is wine having alcohol content of at least 10% by volume, and the process results in lowering the alcohol content to 8% by volume or less.

19. The process according to claim 1 wherein the beverage is a soft drink having sugar content of at least 15% by weight, and the process results in lowering the sugar content to 10% by weight or less.

20. The process according to claim 1 comprising the further step of: measuring the sugar content or the alcohol content of the beverage obtained in step b.

21. The process according to claim 1 comprising the further step of regenerating the particulate solid material in a microwave oven and/or by steeping it in hot water.

22. The process according to claim 1 comprising the additional step of providing an alcohol adsorption curve of the particulate solid material, and predetermining a desired period of keeping the particulate non-polymeric solid material in contact with the beverage by reference to the adsorption curve.

23. The process according to claim 1 comprising the additional step of monitoring the alcohol content of the beverage.

24. A kit for implementing the process according to claim 1 comprising:
   a. a predetermined amount of the particulate porous adsorbent material; and/or
   b. information on the adsorption properties of the particulate porous adsorbent material suitable for determining an adsorption time; and/or
   c. a tool for measuring the alcohol content of a beverage; and/or
   d. usage instructions.

* * * * *